United States Patent
Green et al.

(10) Patent No.: US 7,866,041 B2
(45) Date of Patent: Jan. 11, 2011

(54) METHOD OF MANUFACTURING A DUCT FOR A GAS TURBINE ENGINE

(75) Inventors: Richard Green, Bristol (GB); Peter Frost, Bristol (GB); Michael Annear, Bristol (GB)

(73) Assignee: Rolls-Royce PLC, London (GB)

( * ) Notice: Subject to any disclaimer, the term of this patent is extended or adjusted under 35 U.S.C. 154(b) by 1310 days.

(21) Appl. No.: 11/400,226

(22) Filed: Apr. 10, 2006

(65) Prior Publication Data

US 2006/0242830 A1 Nov. 2, 2006

(30) Foreign Application Priority Data

Apr. 11, 2005 (GB) .................. 0507362.2

(51) Int. Cl.
B21K 25/00 (2006.01)
C21D 8/00 (2006.01)
G21C 21/10 (2006.01)

(52) U.S. Cl. .................. 29/889.2; 29/418; 29/447; 29/525.14; 72/364; 148/646

(58) Field of Classification Search .......... 29/889.2, 29/447, 418, 525.14; 72/60, 61, 62, 200, 72/202, 203, 208, 342.7, 364; 60/232; 239/265.35; 148/510, 646, 669
See application file for complete search history.

(56) References Cited

U.S. PATENT DOCUMENTS

| | | | | |
|---|---|---|---|---|
| 3,383,900 A | * | 5/1968 | Van Hartesveldt | 72/342.7 |
| 3,559,278 A | * | 2/1971 | Brandberg et al. | 228/151 |
| 3,986,654 A | * | 10/1976 | Hart et al. | 228/155 |
| 4,604,785 A | * | 8/1986 | Eddens | 29/463 |
| 4,822,219 A | * | 4/1989 | Wood et al. | 409/137 |
| 4,989,433 A | * | 2/1991 | Harmon et al. | 72/38 |
| 5,058,411 A | * | 10/1991 | Siemers et al. | 72/342.4 |
| 5,305,359 A | | 4/1994 | Adamson et al. | |
| 5,341,665 A | | 8/1994 | Christophel et al. | |
| 5,407,494 A | | 4/1995 | Post | |
| 6,241,832 B1 | | 6/2001 | Miller | |

FOREIGN PATENT DOCUMENTS

EP 0 385 719 A2 9/1990

* cited by examiner

Primary Examiner—David P Bryant
Assistant Examiner—Sarang Afzali
(74) Attorney, Agent, or Firm—Oliff & Berridge, PLC (57) ABSTRACT

The present invention provided a method of manufacturing a duct for a gas turbine engine or the like from sheet metal material; the method comprising the steps of: fabricating a duct from sheet material (10,12,14) including rolling or folding metal sheet along ruled lines to form a ruled surface geometry approximately corresponding to at least part of a desired irregular final duct geometry; welding corresponding rolled or folded parts of the duct skin together and positioning the duct on a heat treatment fixture (30) having a shape corresponding to the said desired irregular duct geometry; the material of the heat treatment fixture having a greater thermal expansion coefficient than the duct material; heating the duct and fixture substantially to a stress relieving temperature of the duct material such that differential thermal expansion of the duct and fixture at the said stress relieving temperature causes the duct to distort and adopt the shape of the exterior surface of the fixture on which the duct is located.

20 Claims, 5 Drawing Sheets

METHOD OF MANUFACTURING A DUCT FOR A GAS TURBINE ENGINE

This invention relates to a method of manufacturing irregular shape ducts for gas turbine engines and the like and in particular concerns a method of manufacturing irregular duct geometries for gas turbine engine nozzle sections by a process involving minimal creep forming.

The present invention finds particular application in the manufacture of irregular shape duct casings such as those found in the Rolls-Royce Three Bearing Swivel Nozzle developed for vertical takeoff and landing aircraft applications. The Rolls-Royce Three Bearing Swivel Nozzle is a gas turbine engine exhaust nozzle that is capable of vectoring engine thrust downwards from the horizontal direction for jet-borne flight. The nozzle is divided into three sections by respective scarfed planes angled at + and −65 degrees to the notional horizontal axis of the nozzle. Each nozzle casing or section comprises an upstream and a downstream flange separated by a wall of sheet material. The nozzle sections are rotatable with respect to each other and when contra-rotated they redirect the thrust of the engine between the horizontal and the vertical directions.

It is known to manufacture nozzle duct sections using a "hot creep" blow pressure moulding process to form a complete cylinder which is then cut into the three sections followed by chemical machining (ECM) the parted sections to the required wall thickness. There are a number of disadvantages associated with "hot creep" forming, in particular the detrimental effects the elevated process temperature has on the properties of the duct material when held for relatively long periods. This problem is particularly relevant when "hot creep" forming titanium nozzle sections. Another disadvantage of this known method is that once the sections have been parted any subsequent distortion of the sections due, for example, to any subsequent welding of the sections, cannot be corrected using the original nozzle section forming tools. Chemical machining of the parted nozzle sections to the desired wall thickness is also a relatively expensive process.

There is a requirement for an improved method of manufacturing duct sections for gas turbine engines and in particular an improved method for the manufacture of irregular shape nozzle sections of the type found in thrust vectoring three bearing swivel nozzles for vertical takeoff and landing aircraft.

An aspect of the present invention provides a method of manufacturing a duct for a gas turbine engine or the like from sheet metal material; the method comprising the steps of: fabricating a duct from sheet material including rolling or folding metal sheet along ruled lines to form a ruled surface geometry approximately corresponding to at least part of a desired irregular final duct geometry; positioning the duct on a mandrel having a shape corresponding to the said desired irregular duct geometry; the mandrel material having a greater thermal expansion coefficient than the duct material; heating the duct and mandrel substantially to a stress relieving temperature of the said duct material such that differential thermal expansion of the duct and mandrel at the said stress relieving temperature causes the duct to distort and adopt the shape of the mandrel surface on which the duct is located.

The method according to the above aspect of the invention readily enables irregular shape ducts to be accurately and repeatedly manufactured in a process where the maximum heat treatment temperature is significantly less than in known methods of "hot creep" pressure blow forming. By heating the duct material to or near its stress relieving temperature there is no significant change in the properties of the duct material and as only limited "creep" occurs there is no significant variation in the wall thickness of the duct so formed.

Preferably the difference between the ruled surface geometry and the desired irregular geometry of the duct is sufficient to allow the fabricated duct to be located on the mandrel with a clearance or interference fit prior to heating. The differences between these geometries is also sufficiently small to ensure the duct is permanently distorted to its desired final geometry by the relative expansion of the mandrel against the interior surface of the duct. The method of the present invention therefore readily enables irregular duct geometries to be produced by first producing an approximate ruled surface geometry of the duct by rolling or folding methods and then hot sizing the approximate geometry so formed to the final desired geometry of the duct. This is readily achieved when the differences, or errors, between the approximate ruled surface geometry and the final desired irregular geometry are within the limits of the thermal differential expansion capabilities of the particular hot setting process for that duct geometry. In this way it is possible to form complex irregular duct geometries from flat sheet material without significantly changing the wall thickness of the sheet material.

In preferred embodiments of the present invention the metal sheet is machined prior to rolling or folding to form the ruled surface geometry. The metal sheet is preferably machined to provide regions of different thickness, for example to provide one or more pockets of substantially uniform thickness with regions of greater thickness located within the pocket or pockets. For example, where it is desirable to increase the local stiffness of a region or regions of the duct it is possible to machine the sheet to provide an increased wall thickness in these areas. The sheet may be machined to provide reinforcement features such as bosses or the like upstanding from the notional surface of the reduced thickness pocket or pockets on the surface of the sheet.

Preferably the metal sheet is machined on its side which is to form the exterior of the duct. In this way it is possible to maintain a substantially smooth surface on the opposite side of the sheet for forming the interior of the duct. The smooth interior surface provides a uniformly smooth contact surface for assisting location on the mandrel and readily enables the duct to distort in a uniform manner during the hot setting heat treatment process.

The metal sheet is preferably machined on a vacuum bed by chip machining, for example high speed milling or the like. In this way it is possible to machine sheets accurately and repeatedly to ensure consistency of the wall thickness of the duct skins.

In preferred embodiments the wall thickness of the duct is substantially in the range 1 to 5 mm and more preferably 3 to 4.5 mm.

Preferably the duct comprises two or more metal sheets joined together after rolling or folding to form a continuous hoop. Preferably, the duct is formed from two metal sheets that have been rolled or folded to form opposite half shells of the duct. The duct halves are then preferably welded together to form a continuous hoop configuration before being positioned on the mandrel. In other embodiments the duct halves may be welded together along one longitudinal joint with the second joint being welded when located on the mandrel.

In preferred embodiments the mandrel further comprises top and bottom end annular clamp plates. One or both clamp plates may be detachably removable from the main body portion of the mandrel to allow the duct to be positioned on and removed from the mandrel. The duct may be clamped down between the top and bottom plates to ensure positive engagement of the ends of the duct with the respective end plates prior to the heat treatment step. The duct is retained between the top and bottom plates during the heating step.

Preferably, the relative dimensions of the duct and the mandrel are such that a clearance exists between the ends of the duct and the respective end plates of the mandrel after heating. In addition, it is preferred that the relative dimensions of the duct and the mandrel outer surface are such that a cold clearance gap of between 1 and 3 mm exists between the duct and the contact surface of the mandrel after heating.

In preferred embodiments the fabricated duct is angularly located on the mandrel by location means such as a locating pin which passes through the wall of the duct being formed and into a receiving bore or aperture in the mandrel. The locating pin preferably passes through a part of the duct wall which does not form part of the finished component.

The heating step preferably comprises the step of maintaining the duct and mandrel at or near the stress relieving temperature of the duct material for a period of at least 10 minutes. Preferably the stress relieving temperature is maintained for a period between 20 and 40 minutes and most preferably for 30 minutes or thereabouts. For titanium ducts the stress relieving temperature is preferably in the range 650 to 700° C. although lower temperatures from 600° C. may be used.

In preferred embodiments of the present invention the mandrel tapers from a first side to a second diametrically opposite side with the shorter side having a length dimension at least half the length of the longer side. This readily enables irregular shape scarfed cylindrical or conical ducts to be formed by the method of the present invention as at least half of the length of the duct is in the form of a continuous hoop which provides sufficient stiffness in the hoop direction to ensure satisfactory forming (re-sizing) of the duct during the heat treatment step. This is particularly significant in embodiments where it is desirable to form a non-hoop-continuous duct skin having an angled scarf plane which cuts through the duct such that the duct is open on one side. In such embodiments the duct is first formed by the aforementioned method then cut to a non-hoop-continuous configuration.

In preferred embodiments the method further comprises the step of welding first and second circumferential flanges to the respective first and second ends of the duct.

In preferred embodiments the duct material is titanium or a titanium alloy and the mandrel material is a nickel-chromium alloy. The thermal expansion properties of these materials are well known and are particularly suitable for hot sizing duct structures of the type contemplated by the method of the present invention.

In preferred embodiments the duct comprises a nozzle duct section for a gas turbine engine or the like and preferably an angled or scarfed duct section in a three bearing thrust vectoring swivel nozzle of the aforementioned type. The present invention also contemplates a nozzle for a gas type turbine engine or the like comprising a duct section manufactured according to the previously mentioned method.

In the method of the present invention it is preferred that the duct and mandrel are heated to the stress relieving temperature of the duct material in a vacuum.

Various embodiments of the present invention will now be more particularly described, by way of example only, with reference to the accompanying drawings; in which.

The following description specifically refers to the manufacture of an irregular shape nozzle duct section for a three bearing swivel nozzle for a gas turbine engine. However, it will be understood that that method of the present invention herein described is applicable to the manufacture of any irregular shape duct without limitation to gas turbine engine thrust vectoring nozzles.

Figure 1:
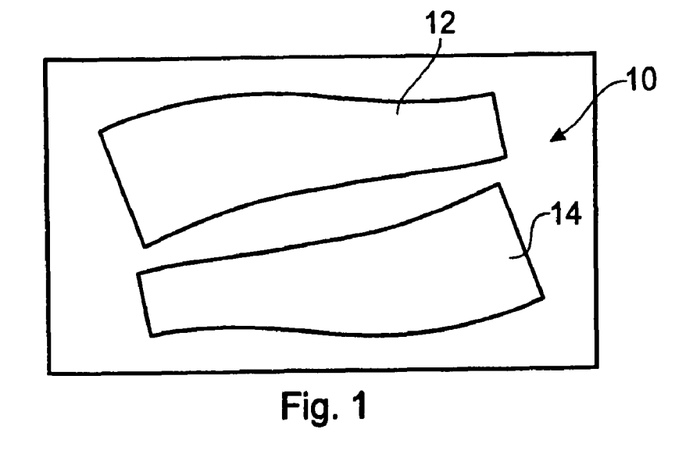
FIG. 1 is a plan view of a flat sheet of material on which the profiles of two corresponding duct wall sections are shown.

Referring to FIG. 1, there is shown a flat sheet 10 of titanium having a thickness of 4.7 mm a length dimension of 8 feet (approximately 2.4 metres) and a width dimension of 4 feet (approximately 4.2 metres). In the drawing of FIG. 1 two regions of the sheet are shown in outline at 12 and 14. These regions or templates define complimentary halves for forming a continuous, but irregular, shape duct. The two dimensional shape of the outline regions 12 and 14 is determined from a required three dimensional geometry of the duct to be formed. Such two dimensional profiles may be readily determined from a final desired geometry of a regular or irregular shaped duct using well known commercially available computer aided design (CAD) software, for example as provided by uni-graphics (registered trademark). It will be understood that in the case of complex irregular ducts the software generated two dimensional templates such as 12 and 14 will include peripheral errors, and therefore it is only possible to provide a "best-fit" two-dimensional template representative of the three dimensional geometry of the duct to be formed. The two-dimensional template is modified to ensure that the diameter of the duct generated by development of the template is undersized relative to the diameter of the final desired geometry, but substantially the same axial length as the finished component. This 'diametrical undersize' can be incorporated by basing the two-dimensional profile on a duct which has been modified from the final desired geometry to be diametrically undersized, or by adapting the peripheral errors introduced by the conversion process, or a combination of both.

The flat sheet 10 enables the templates 12 and 14 to be machined flat to a desired wall thickness incorporating a desired relief pattern, of for example pockets, strengthening ribs, bosses and the like. The templates are preferably machined from the sheet 10 using a chip machining process, for example high speed milling with the sheet supported on a vacuum bed of a three axis machine.

Figure 2:
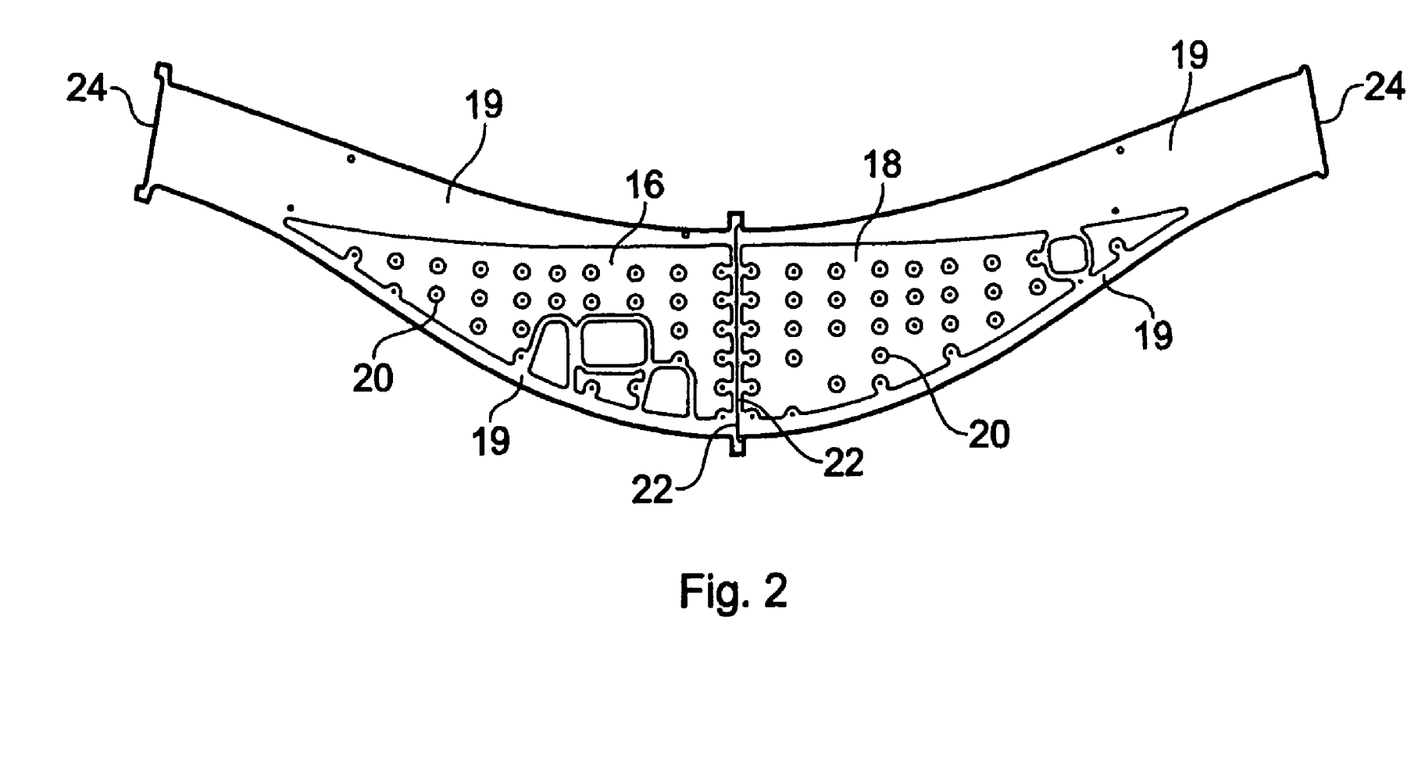
FIG. 2 is a plan view of the duct wall sections of FIG. 1 after machining.

FIG. 2 shows the two complimentary duct halves 12 and 14 machined from the sheet 10 incorporating a desired relief pattern on one side of the machined templates only. In the drawing of FIG. 2 the interior region of the templates has been machined to a thinner wall thickness than the remaining surrounding regions to create one or more recessed pocket regions 16 and 18 over the surface of the respective templates. The pockets are machined to a depth of 1.7 mm or thereabouts such that the wall thickness of the pockets is about 3 mm. The pockets are machined with a plurality of upstanding circular and oval shape bosses 20 regularly spaced in rows and columns in the major pocket regions 16 and 18 of the respective templates. The bosses provide local areas of increased wall thickness and hence reinforcement for mounting other components on the duct when finally formed. The bosses may have a wall thickness substantially equal to the remaining un-machined parts 19 of the respective templates surrounding the major pockets 16 and 18. It is to be understood that only one side of the templates is machined and the underside (not shown) remains substantially free of any surface discontinuities at this stage in the manufacturing process.

In the drawing of FIG. 2 the machined templates are arranged in side by side abutment with the machined surfaces that are to form the exterior of the duct arranged face-up. The respective ends 22 and 24 of the templates are formed with location features for locating the corresponding ends of the templates together in readiness for welding.

Prior to welding together the machined templates are individually rolled or folded along pre-determined ruled lines to form respective duct skin halves such that when the halves are welded together they form a ruled surface geometry approximately corresponding to a desired irregular final duct geometry of the duct to be formed. In the example shown the desired duct geometry approximates to a ruled surface between distorted ellipses at the respective ends of the duct as is more particularly described with reference to FIGS. 3 to 7. The ruled lines are developed by dividing each end ellipse into an equal number of divisions and joining the corresponding points on the periphery of the ellipses by straight lines. These lines are provided at 6 cm intervals about the circumference of the ellipses, each of which is about 3.8 m.

The templates are either rolled or folded along these lines and in the case of rolling the lines are marked on the template to ensure the templates are fed through the rolls of the rolling apparatus with the lines maintained parallel to the axis of the rolls during the rolling process. The lines may be marked on the smooth under surface of the machined templates using a suitable marking material, for example a marking wax or the like. In the case of folding, the machined templates are folded by small amounts along ruled lines at an appropriate spacing such that small radius folds are introduced along the length of the templates. The templates may be folded along ruled lines which pass through, and preferably parallel with, a row of upstanding bosses on the surface of the duct templates.

Figure 3:
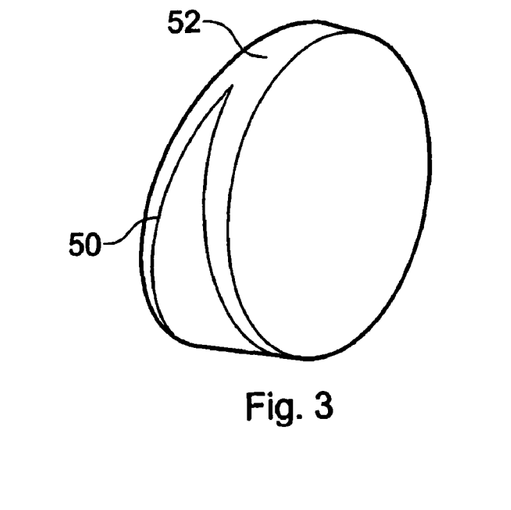
FIG. 3 is a three dimensional representation of a duct section fabricated from the sheet metal sections shown in FIGS. 1 and 2.
Figure 4:
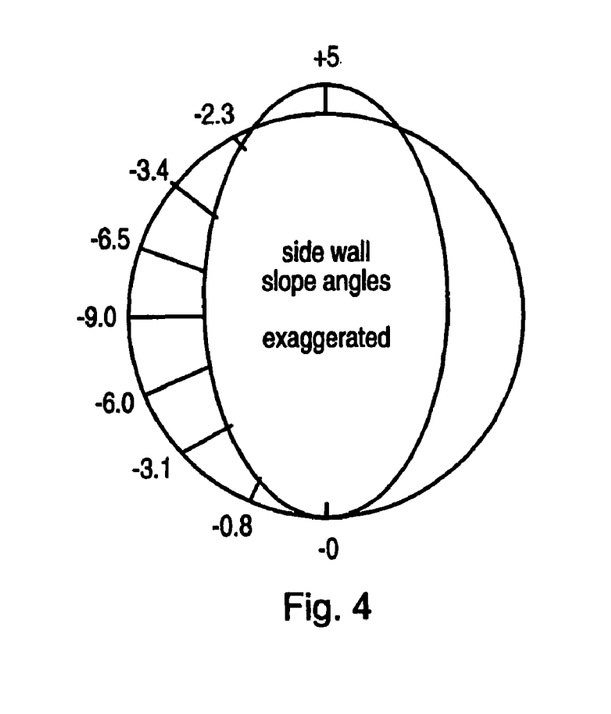
FIG. 4 is a schematic representation of the variation of the angle of the sides of the duct of FIG. 3 around the duct periphery, with respect to the notional axis of the duct.

Once the templates have been rolled or folded to form a pair of complementary duct halves the longitudinal edges 22 and 24 of the halves are welded together to form a hoop-continuous duct wall structure. The duct halves are preferably welded first along their respected longer longitudinal edges 22 and then welded together along the shorter edges 24 on the diametrically opposite side of the duct. The duct formed at this stage of the manufacturing process comprises a ruled surface geometry approximately corresponding to the desired irregular final duct geometry defined by the respective distorted ellipses at the open ends of the duct. In the example so far described the desired irregular duct geometry is shown in the drawings of FIGS. 3 and 4.

The ruled surface duct geometry formed by the aforementioned process only approximates to the desired final duct geometry because in this irregular final geometry the radius at each end of the ruled lines continuously changes around the duct periphery. In the ruled surface approximation this is not the case. This geometric difference is corrected by a subjecting the duct to a heat treatment process. The welded duct is forced over a heat treatment fixture 30 which comprises a mandrel 32 having an outer surface substantially corresponding to the shape and size of the interior of the desired irregular duct geometry to be formed, see FIGS. 5 to 7. The 'diametrical undersize' applied to the two-dimensional template, ensures that the duct formed by rolling or folding of the template along the ruled lines is slightly undersized, prior to heat treatment, but only in the circumferential direction.

Figure 5:
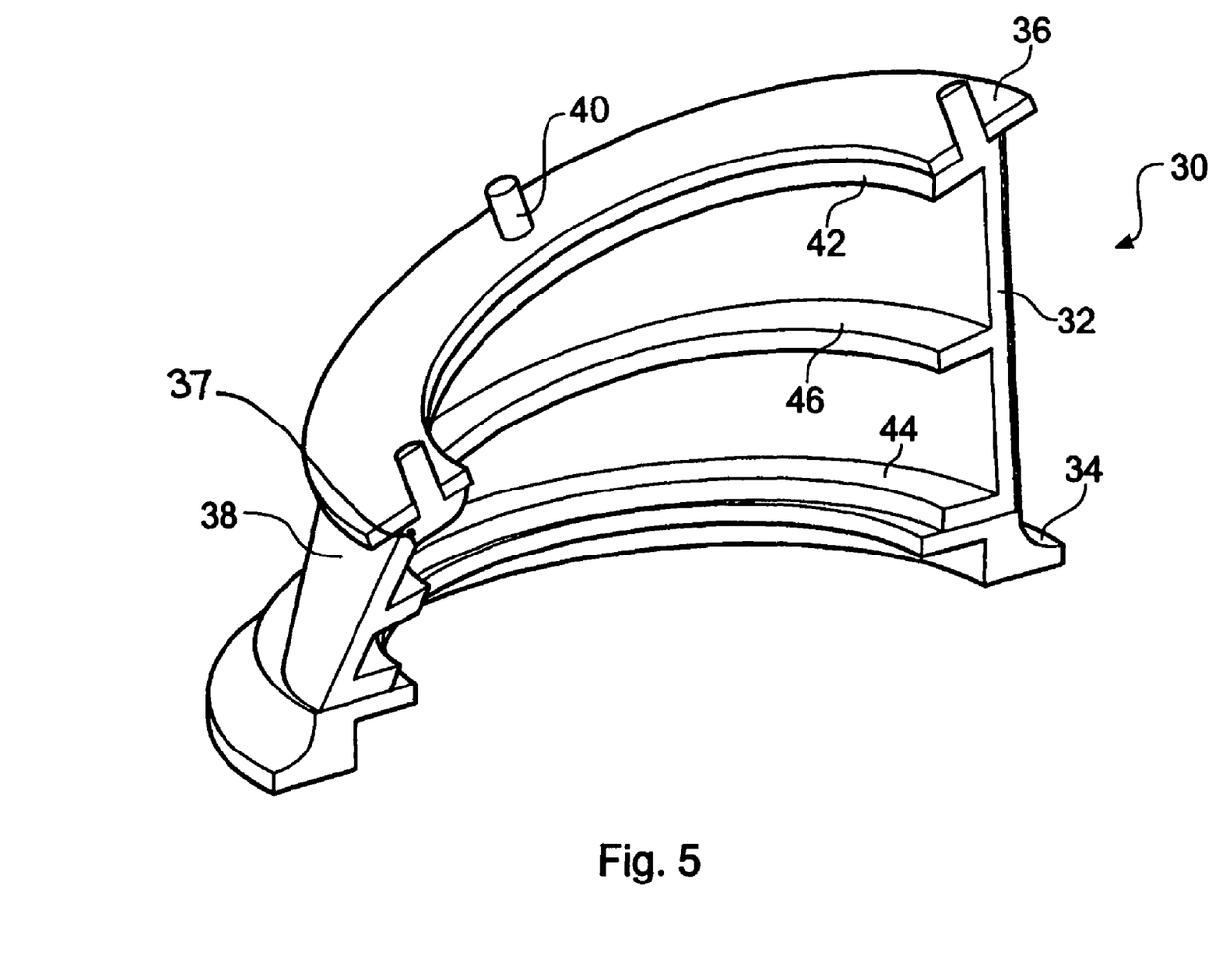
FIG. 5 is a part section three-dimensional view of a heat treatment fixture for use in the method of the present invention.
Figure 6:
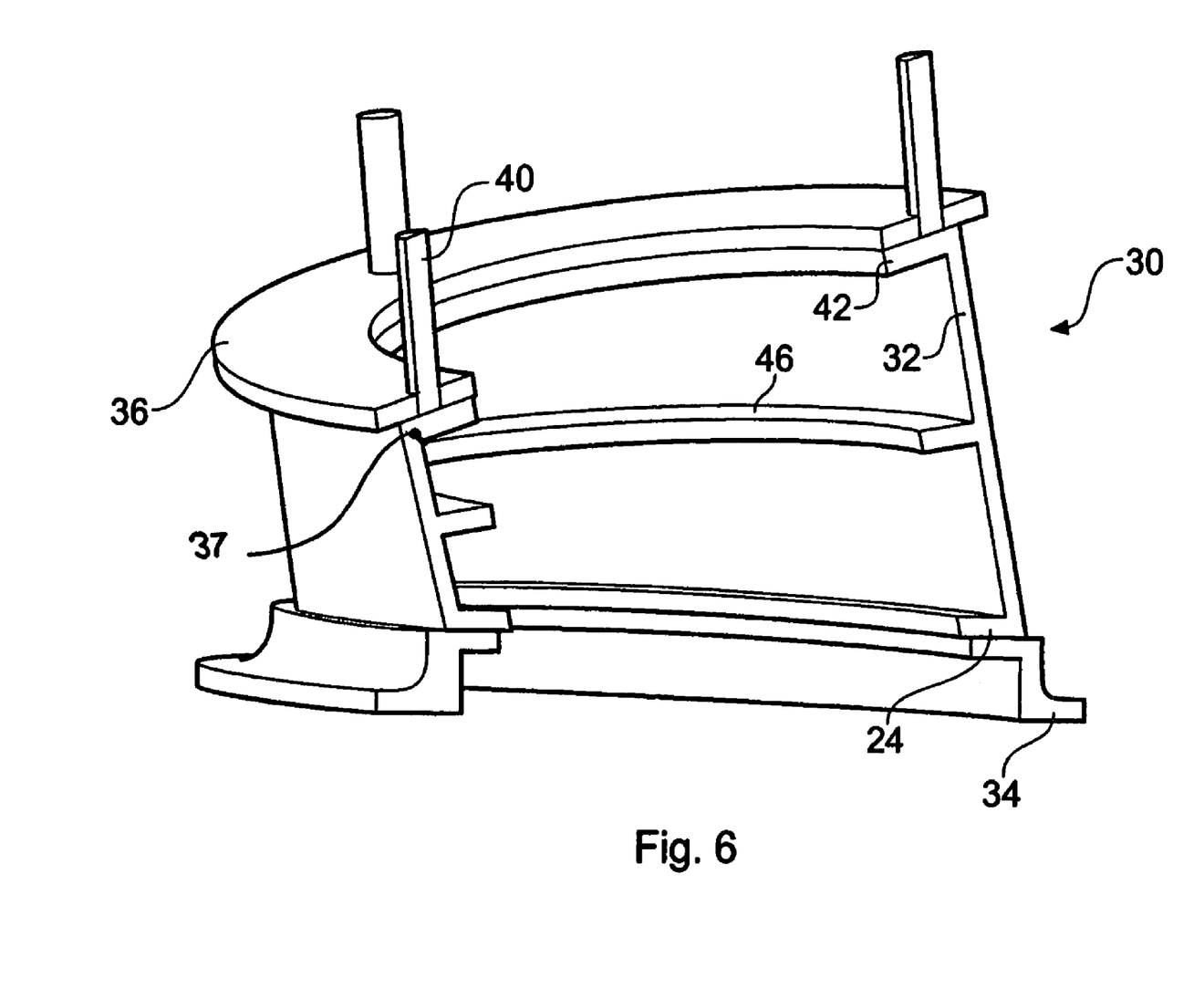
FIG. 6 is a similar view to that of FIG. 5 with the heat treatment fixture viewed from a different angle.

The heat treatment fixture 30 will now be described in greater detail with reference to FIGS. 5 and 6. The heat treatment fixture comprises a hollow mandrel 32 having an irregular distorted conical shape and a pair of substantially annular clamping rings 34 and 36 located at the respective open ends of the mandrel 32. The mandrel and clamping rings are preferably of the same material, for example a nickel-chromium alloy suitable for use in heat treatment processes having a maximum process temperature of 650° C., 700° C. or higher. A plurality of thermocouples 37 (only one shown) are buried in the thickest parts of the mandrel.

The outer surface 38 of the mandrel has a shape and size which corresponds to the desired geometry of the interior surface of the irregular duct to be formed, but which is undersized relative to the duct at room temperature, allowing a clearance between the welded rule surface duct and the mandrel. The welded ruled surface duct is located on the mandrel 32 by removing the top clamp plate 36 and forcing the welded duct over the mandrel until it engages the lower clamp ring 34. The upper clamp plate 36 is held in position by a plurality of pin type wedges 40 which pass through respective apertures in the upper region of the mandrel 32. As can be seen in the drawings of FIGS. 5 and 6 the mandrel is provided with the plurality of stiffening rings having a distorted elliptical shape, including a top ring 42, a bottom ring 44 and a central intermediate ring 46 substantially mid-way between the rings 42 and 44. The rings extend around the interior surface of the mandrel to ensure uniform expansion of the mandrel on heating.

Once the welded duct is located on the mandrel the heat treatment process begins. The duct and heat treatment fixture are heated in a vacuum environment steadily up to the stress relieving temperature (±10° C.) of the duct material, which in the case of titanium is 650° C. or thereabouts. When the whole of the mandrel is at the stress relieving temperature, ensured by measuring the temperature of the thickest regions of the mandrel via thermocouples 37, the assembly is held at this maximum cycle temperature for 30 minutes or thereabouts then progressively cooled to room temperature.

The dimensions of the mandrel are undersized by factor M so that at the maximum process temperature, 650° C., the differential between the expansion rate of the mandrel and duct materials ensures that the mandrel is the same size as the final desired geometry duct at the same temperature.

Where M=1−[(thermal coefficient of expansion of the mandrel material)−thermal coefficient of expansion of the duct material)]×[(maximum cycle temperature)−(design temperature)].

In the present example, the factor M is 1−[(1.000017/° C.−1.000010/° C.)×(650° C.−20° C.)]=0.99559. However, at the maximum cycle temperature, it has been found advantageous to 'oversize' factor M by about 0.01% to ensure that the mandrel is slightly oversize at the maximum cycle temperature.

The combination of 'diametrical undersize' of the duct and the oversize of the mandrel ensures that, at the maximum cycle temperature, the mandrel engages the duct and so applies stress to it, principally in the hoop direction. This ensures that the approximate geometry of the rolled, or folded, duct is worked into the final desired duct geometry via the stress relief process. The combination permits a greater stress to be imparted to the duct than if either is used separately. This in turn allows a useful amount of work to be done to the duct at temperatures comfortably below those associated with "hot creep" forming, avoiding the detrimental effects set out previously.

The 'diametrical undersize' is determined as a function of the relative thermal expansion of the workpiece and the mandrel, and of the mean diameter of the workpiece. In the present example, the final desired mean diameter of the duct geometry is about 1.2 metres, and this is undersized by 1 mm, for a thermal expansion differential, between mandrel and duct, of $7 \times 10^{-6}$.

The heat treated duct is then removed from the mandrel for subsequent manufacturing steps. One such step may involve welding bosses to the exterior surface of the duct to provide local areas of reinforcement. As this welding of the duct casing or other post-heat treatment steps may cause the duct casing to deform, where desirable the heat treated casing may be subject to a second heat treatment by positioning the duct casing on the mandrel and repeating the heat treatment process to remove any distortions to the duct introduced after the initial heat treatment processes.

Figure 7:
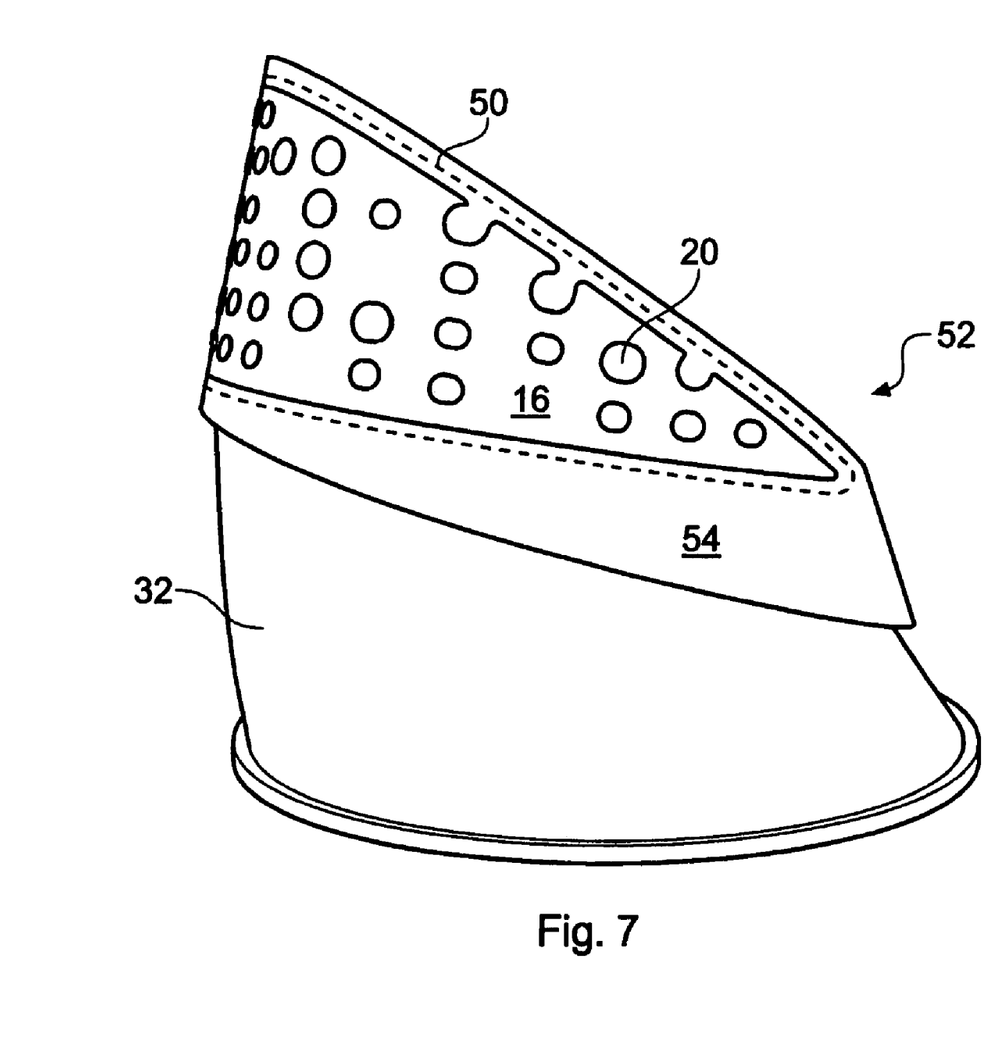
FIG. 7 is a perspective view of a nozzle duct section formed by a method of the present invention with the duct section sitting on top of a heat treatment fixture similar to that shown in FIGS. 5 and 6.

In the method described the duct casing, or at least part thereof, comprises the skin of an irregular shaped nozzle section in a three bearing type thrust vectoring swivel nozzle for a gas turbine engine. Following the heat treatment process the duct casing is further machined so that only the area of the skin bounded by line 50 (shown in part in FIGS. 3 and 7), remains. As can be seen in FIGS. 3 and 7 the remaining skin of the duct is non-continuous and defines a gap at the respective ends of the hoop where the top and bottom planes at the respective ends of the remaining duct section intersect. Annular mounting and actuation flanges are welded to the top and bottom openings of the duct wall such that the flanges converge in the region of the circumferential gap of the skin to provide a continuous nozzle duct section in which the wall skin extends around the majority of the duct but not around the entire duct perimeter.

Referring now to the drawing of FIG. 7 which shows a post-heat treated nozzle duct casing 52 partly removed from the mandrel 32 on which it was mounted during the heat treatment process. The flat non-machined region 54 around the periphery of the duct surrounding the major pocket, on one side of the duct that is showing is generally waste material since it is subsequently removed, as described above, to form a non-hoop continuous nozzle duct wall skin. However in order for the heat treatment process to achieve the required duct geometry it is necessary to expand the sheet metal duct as a hoop continuous structure and in order to do this satisfactorily it is desirable that the length of the weld line 24 on the narrow side of the duct is at least half that of the length of the weld on the wider side of the duct. In the drawing of FIG. 7 the dashed lines 50 represent the material that is removed from the duct skin to provide the non-hoop continuous nozzle or structure previously described. The dashed line 50 is shown in solid in the drawing of FIG. 3 which illustrates the non-hoop continuous structure of the duct wall skin ultimately formed in the embodiment described herein.

The invention claimed is:

1. A method of manufacturing a duct for a gas turbine engine or the like from sheet metal material, wherein the duct has an irregular final duct shape in which either end of the duct is substantially elliptical and the ends are joined by a continuous surface, the method comprising the steps of:

developing a ruled geometry by dividing each end ellipse into an equal number of divisions and joining corresponding points on a periphery of the ellipse by straight lines;

fabricating a template of sheet material;

marking on the sheet metal template a plurality of ruled lines to form a ruled surface geometry corresponding to the ruled geometry, rolling or folding the sheet metal template along the ruled lines, and during a rolling process, ensuring that the templates are fed through rolls of a rolling apparatus with the ruled lines maintained parallel to an axis of the rolls;

joining the template to form an approximate duct shape;

positioning the joined template on a mandrel, the shape of which corresponds to the desired irregular duct geometry; the mandrel material having a greater thermal expansion coefficient than the sheet metal material; and heating the joined template and mandrel substantially to a stress relieving temperature of the sheet metal material such that differential thermal expansion of the sheet metal and mandrel at the stress relieving temperature causes the joined template to distort and adopt the shape of the mandrel surface on which the joined template is located.

2. A method as claimed in claim 1 wherein said metal sheet is machined prior to said rolling or folding step.

3. A method as claimed in claim 2 wherein the metal sheet is machined to provide regions of different thickness.

4. A method as claimed in claim 3 wherein the sheet is machined to provide at least one pocket of substantially uniform thickness with regions of greater thickness within the pocket(s).

5. A method as claimed in claim 4 wherein the regions comprise reinforcement features such as bosses or the like.

6. A method as claimed in claim 2 wherein the metal sheet is machined on its side which is to form the exterior side of the duct.

7. A method as claimed in claim 2 wherein the metal sheet is machined on a vacuum bed by a chip machining process.

8. A method as claimed in claim 1 wherein the heating step comprises maintaining the duct and mandrel substantially at the stress relieving temperature for a period of at least 10 minutes.

9. A method as claimed in claim 8 wherein the duct and mandrel are maintained at the stress relieving temperature for a period of between 20 and 40 minutes.

10. A method as claimed in claim 9 wherein the duct and mandrel are maintained at the stress relieving temperature for a period of between 25 and 35 minutes.

11. A method as claimed in claim 1 wherein the mandrel comprises top and bottom end plates at least one of which is detachably removable to allow the duct to be positioned on and removed from the mandrel.

12. A method as claimed in claim 11 wherein the duct is retained between the top and bottom plates during the heating step.

13. A method as claimed in claim 1 wherein the difference between said ruled surface geometry and the desired final duct shape is sufficient to allow the joined template to be located on the mandrel with a clearance gap prior to heating and sufficiently small to ensure the joined template is permanently distorted to the desired final duct shape by the relative expansion of the mandrel against the interior surface of the joined template on heating.

14. A method as claimed in claim 1 wherein the stress relieving temperature is substantially in the range 650-700° C.

15. A method as claimed in claim 1 wherein the duct is angularly located on the mandrel by at least one locating pin.

16. A method as claimed in claim 1 wherein the duct positioned on the mandrel tapers from a first side to a second diametrically opposite side and wherein the shorter side has a length at least half the length of the longer side.

17. A method as claimed in claim 1 wherein the relative dimensions of the duct and the mandrel outer surface are such that a cold clearance gap of between 1 and 3 mm exists between the duct and the mandrel after the heating step.

18. A method as claimed in claim 1 further comprising the step of removing waste material from the duct formed on the mandrel to provide a non-hoop-continuous duct.

19. A method as claimed in claim 1 further comprising the step of welding first and second circumferential flanges at the respective axial ends of the duct.

20. A method as claimed in claim 1 wherein the duct material is titanium or a titanium alloy, and the mandrel material is a Nickel Chromium alloy.

* * * * *